June 8, 1971   X. T. STODDARD   3,583,910
HARD WATER TREATMENT

Filed Feb. 19, 1969   2 Sheets-Sheet 1

INVENTOR
Xerxes T. Stoddard
BY
ATTORNEY

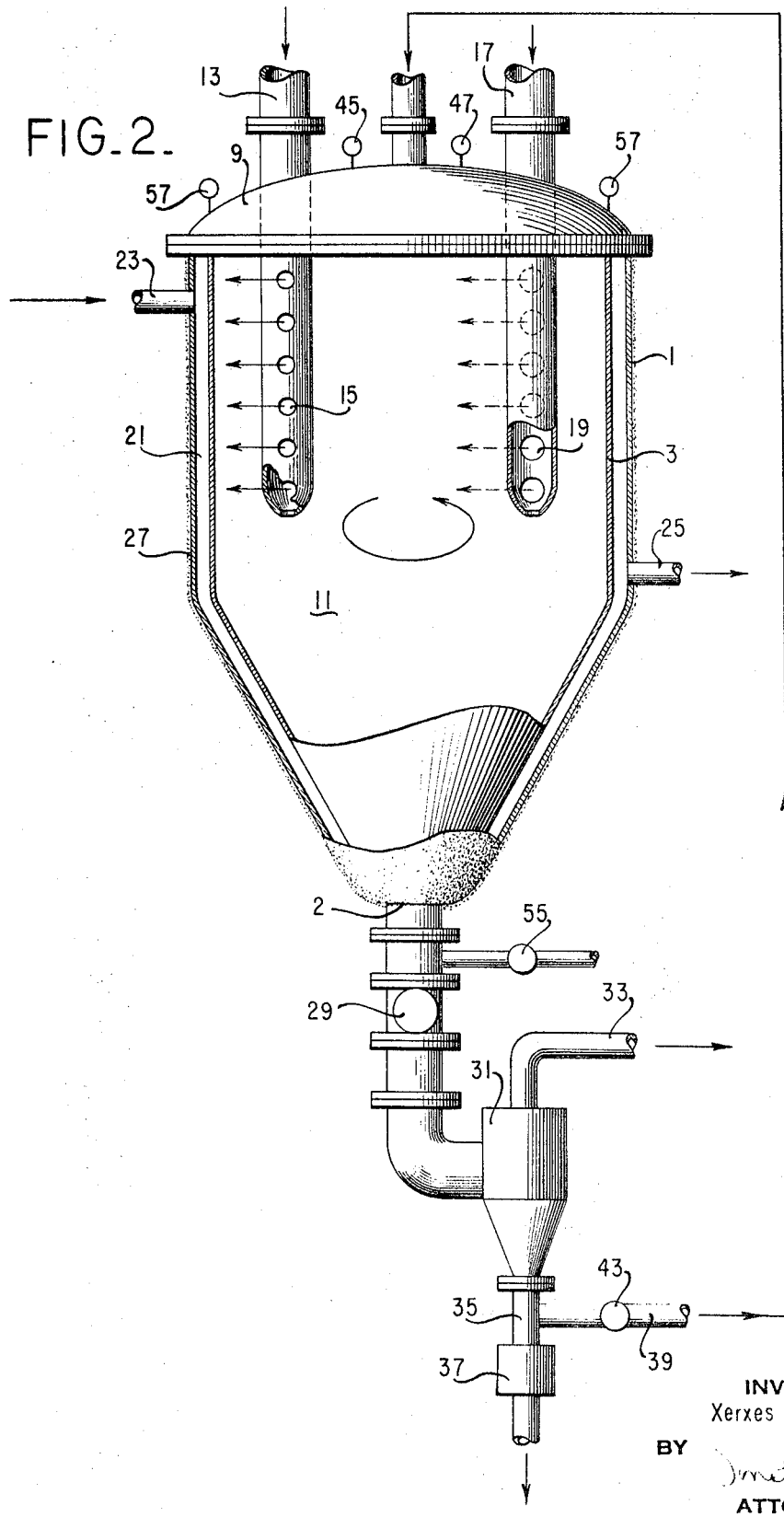

3,583,910
HARD WATER TREATMENT
Xerxes T. Stoddard, Rosenberg, Tex., assignor to Allied
 Chemical Corporation, New York, N.Y.
Filed Feb. 19, 1969, Ser. No. 800,437
Int. Cl. C02b 1/22
U.S. Cl. 210—46                            13 Claims

ABSTRACT OF THE DISCLOSURE

Objectionable precipitable compounds are removed from water by bringing the water to a condition of labile supersaturation through an appropriate heating procedure. The conditions are controlled in order that the solids may be precipitated spontaneously at a selected time or place in such a way that they do not form as a scale in the equipment and are then separated from the water.

BACKGROUND OF THE INVENTION

This invention relates to an improved method and apparatus for eliminating objectionable precipitable compounds from water and particularly for eliminating such compounds or hardness which are precipitable by increasing the temperature of the water. It relates particularly to such a method and apparatus useful for heating and conditioning waters to render them suitable for transmission and use at elevated temperatures without scale deposition, particularly on heat transfer surfaces, either required in conditioning and heating the water or in its subsequent use.

A large number of industrial processes utilize large volumes of water at elevated temperature and pressure. Generally, large local supplies of relatively low hardness water, which can be chemically treated in economical fashion to remove hardness therefrom, are not readily available. Therefore, it is necessary to employ accessible contaminated waters containing relatively large quantities of scale-forming salts, or transport low hardness water to the production site.

Conditioning contaminated waters conttaining relatively large quantities of scale-forming salts by conventional methods, such as chemical treating, ion exchange and evaporation is too costly to be practical; however, the heating of such waters without treatment causes severe scaling on heat transfer surfaces and process equipment rendering continuous operation difficulty, if not impractical, in view of excess cleaning costs.

Scales formed upon heating hard waters of the type mentioned above generally include calcium carbonate (calcite) and one or more types of calcium sulfate (gypsum, hemihydrate, anhydrite). The type of calcium sulfate scale which predominates is primarily dependent upon the temperature at which the scale is formed.

All of the above salts tend to precipitate with increasing temperature. Broadly speaking, these salts have inverse solubility characteristics, since their ability to stay in solution or their solubility decreases with increasing temperature due either to chemical changes or their solubility characteristics. Thus it can be seen that heating waters containing these salts reduces their solubility and frequently results in the precipitation of these salts as a scale.

With the present process and apparatus, in contrast to prior ones, it is possible to remove the objectionable amounts of the above mentioned materials easily and inexpensively without the formation of objectionable scale deposit, either in the apparatus itself or on surfaces which are encountered in the water after treatment. Other, and more distinct, advantages of the present process will become apparent upon examination of the following detailed disclosure.

SUMMARY OF THE INVENTION

In accordance with the instant invention, scale-forming salts are removed from hard waters by contacting the hard water intimately with stream to form a fluid mixture at a temperature and in an amount sufficient to bring the temperature of the hard water to labile precipitation temperature. The term "labile precipitation temperature," as used herein, refers to that temperature to which the water must be raised to induce precipitation. The fluid mixture is maintained in an agitated condition within the treating zone to achieve rapid precipitation of the scale-forming salts. The mixture, having particles of precipitate suspended therein, is discharged into a second zone and maintained therein as a large body in a relatively quiescent state, thereby permitting complete precipitation and effecting separation and settling of the precipitant solids which form a sludge. Upon settling, the softened water forms as a supernatant water layer substantially free of precipitate and is withdrawn from the apparatus. Sludge, which remains in the apparatus, is discharged therefrom into a second settling zone to effect further separation of clarified water from the precipitate, the clarified water being thereafter pumped to the destination of its intended use. The major portion of the remaining sludge is discharged to a waste zone; however, a small portion of the remaining sludge is recirculated from the second settling zone to the treating zone to induce and accelerate the labile precipitating condition therein.

In carrying out the instant process, water to be treated to remove objectionable compounds is brought to a condition of labile supersaturation through appropriate heating procedure without objectionable scale information, and the conditions are controlled so that the solids to be removed are spontaneously precipitated at a selected time or place in such a way that they do not form a scale in the equipment and are then separated from the water. This is preferably accomplished by intimately mixing the water from which the compounds are to be separated with steam, the temperature of the contaminated water being which labile supersaturation occurs. This treatment brings about spontaneous or shock precipitation from the aqueous medium of the compound having the inverse solubility characteristic. The hard water may be preheated or not prior to treatment with steam, although preheating introduces worthwhile economies.

In a preferred form of this invention, feed water is directed into a double-walled chamber and intimately mixed therein, at a point in proximity with its entry, with superheated steam. It is a significant feature of the treating chamber that it is double-walled. The use of a double-walled chamber minimizes the extent to which precipitate form the feed water builds up on the inner surface of the chamber, since the double-wall inhibits the extent to which heat transfer occurs between the inner surface of the interior chamber wall and precipitate coming in contact therewith. The flow rate of the feed water into the chamber is controlled so as to provide adequate residence time for precipitation to occur.

The fluid mixture of hard water and super-heated steam is maintained within the treating zone in an agitated condition to achieve rapid precipitation of the scale-forming salts. Hard water and super-heated steam are injected into the chamber under conditions that cause a circular fluid flow within the treating zone. The fluid mixture containing particles of precipitate suspended therein, discharges into a second zone where it is maintained as a large body in a relatively quiescent state, thereby permitting complete precipitation and effecting separation and settling of the precipitant solids which form a sludge.

Thereafter precipitate is discharged from the chamber.

The extracted water layer may be charged to a liquid cyclone to further minimize remaining turbidity.

The remaining sludge is then passed into a second settling zone to the treating zone to induce and accelerate the labile precipitating condition.

In another embodiment the water-sludge mixture is simultaneously discharged from the chamber into a second settling zone, such as a liquid cyclone, to effect further separation of clarified water from the precipitate and separate recovery of each. As in the former embodiment a portion of the recovered sludge is recirculated from the second settling zone to the treating zone to induce and accelerate the labile precipitating condition.

In accordance with the instant process desirable results are achieved when super-heated steam enters the treating zone at about 360° F. under about 150 p.s.i.g. and the hard water enters the treating zone at about 70° F. It is further found that the soft water obtained is sufficiently hot for first transmission to an industrial process, such as sulfur mining, without further heating.

BRIEF DESCRIPTION OF THE DRAWING

In order to provide a better understanding of this invention, reference will be had to the accompanying drawing which forms a part of this specification; and wherein:

FIG. 2 illustrates a second embodiment of the apparatus for use in precipitating compounds.

DESCRIPTION OF THE PREFERRED EMBODIMENTS

Figure 1:
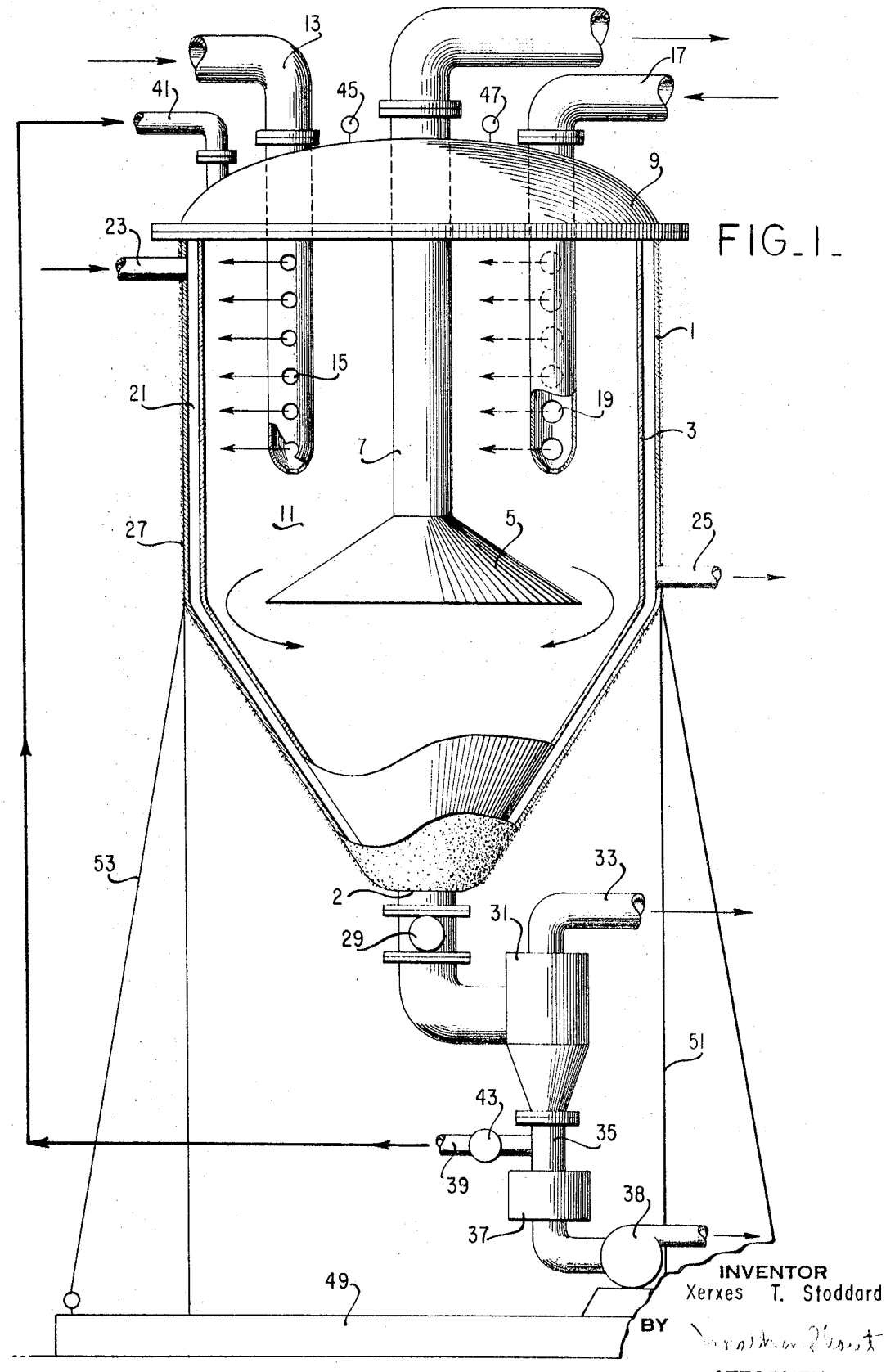
FIG. 1 illustrates the apparatus for use in precipitating compounds.

Referring to FIG. 1, this embodiment includes a cylindrical housing 1, having a conical lower end including a bottom blow-out vent (FIG. 2) therein. Cylindrical hull 3 having a conical lower end is situated within said housing and in spaced relationship thereto and connected therewith at its upper and lower end. An upstanding conical baffle 5 is situated within cylindrical hull and above the lower end thereof and mounted on the lower end of central conduit 7. Central conduit 7 is mounted in and extends axially through chamber head 9.

This conduit serves as an outlet for collected process steam which may then be condensed and removed to filters and desilters or liquid cyclones (not shown).

Head 9 is mounted on housing 1, such that the enclosure forms a pressure chamber 11. In a more preferred embodiment of the present apparatus the head is demountable to facilitate cleaning of the inner chamber.

Hard water inlet 13, having a plurality of jet nozzles 15 therein, is mounted eccentrically in head 9, extends downwardly through chamber 11 and above conical baffle 5 and in spaced relationship thereto. Similarly, steam inlet 17, having a plurality of jet nozzles 19 therein, is mounted eccentrically in head 9, extends downwardly through chamber 11 and above conical baffle 5 and in spaced relationship thereto.

It is a significant feature of the apparatus of this invention that the jet nozzles 15 and 19 are positioned such that a discharge of water and steam into the chamber causes a clockwise or counter-clockwise vortex mixing action within the area of the chamber treating zone. In the embodiment of FIG. 1, a plurality of circular apertures are axially aligned along inlets 13 and 17, however the configurations and alignments of the apertures may be varied with the pressure and mix requirements within the vessel to accommodate a temperature within the vessel treating zone equal to or above the labile supersaturation temperature of the hard water being treated.

In accordance with the embodiment of FIG. 1, inlets 13 and 17 are positioned within the vessel in parallel alignment with central conduit 7. However, the inlets may be positioned in different attitudes, such as from normal to parallel, depending upon the necessary residence time of the fluid mixture of hard water and steam to effect precipitation of the hardness, pressure, and temperature to be maintained within the vessel.

Hull 3 and housing 1, define therebetween a steam passage 21. Steam is introduced to the passage through an inlet 23 and discharged from the passage through an outlet 25. An insulating material 27, such as asbestos, may be wrapped about the housing and connected thereto at its upper and lower end. The use of a double-walled chamber, as described above, minimizes the extent to which precipitate from the feed water builds up on the inner surface of the chamber. The double-wall inhibits the extent to which heat transfer occurs between the inner surface of the interior chamber wall and precipitate coming in contact therewith.

When the scale-forming content of the treated water is low, for example, about 5000 p.p.m., it is found that the same desirable result, inhibition of scale formation, can be obtained by injecting hot water into the passage 21 rather than steam.

In FIG. 1, valve 29 is integrally connected with the bottom blow-out vent 2, said valve remaining in a closed position during the process cycle to prevent process water from passing therethrough. Periodically, valve 29 is placed in an open position during which period precipitate collected within the conical lower end of the vessel is flushed out of the chamber by internal chamber pressure. Discharged sludge is passed through liquid cyclone 31 wherein additional clarified soft hot water is extracted from the precipitate, said water being discharged from the cyclone through outlet 33 for industrial use, such as sulfur mining. Remaining sludge is discharged from the cyclone through outlet 35 to quench pot 37 and thereafter pump 38 to a waste disposal zone. A portion of the sludge discharged through outlet 35 is drawn off through line 39 for recirculation to the chamber treating zone through inlet 41. Valve 43 controls the amount of sludge passing through line 39 for recirculation. The recirculated sludge induces and accelerates precipitation in the chamber treating zone since it tends to seed the formation of precipitable compounds. Gauges 45 and 47 mounted in head 9 respectively indicate pressure and temperature within the vessel.

FIG. 1 illustrates one advantageous method for mounting the apparatus of this invention. The softener is mounted on concrete pad 49 by means of supports 51 and anchors 53 to prevent shifting.

In accordance with FIG. 1, scale-forming salts are removed from hard water of about 70° F., entering pressure chamber 11 through apertured inlet 13, by contacting the hard water intimately with steam, entering chamber 11 through apertured inlet 17, to form a fluid mixture at a temperature and in an amount sufficient to bring the temperature of the hard water to labile precipitation temperature. The fluid mixture is maintained in an agitated, circular mixing condition within the treating zone or upper portion of chamber 11 to achieve rapid precipitation of the scale-forming salts. The mixture, having particles of precipitate suspended therein, is discharged into a second zone or settling zone defined by the lower portion of chamber 11 and maintained therein as a large body in a relatively quiescent state, thereby permitting complete precipitation and effecting separation and settling of the precipitant solids which form a sludge. The chamber double-wall defining steam passage 21 therebetween said walls minimizes the extent to which precipitate from the feed water builds up on the inner surface of the chamber. Upon settling, the softened water forms as a supernatant water layer substantially free of precipitate and is withdrawn from the chamber through line 7 and pumped to a sulfur mining site for use in conjunction with sulfur mining. Sludge, which remains in the chamber, is discharged therefrom, through bottom blow-out vent 2 regulated by valve 29, into liquid cyclone 31 to effect further separation of clarified water from the precipitate, the clarified water being thereafter pumped through line 33 to the destination of its intended use. The major portion of the remaining sludge is discharged from the cyclone through line 35 and pumped to a disposal area; however, a small portion of the remaining sludge is re-circulated from the cyclone to the treating zone, through line 39, to induce and accelerate the labile precipitating condition therein. FIG. 1 is suitable for processing very hard water.

The pH of the water introduced into the apparatus of FIG. 1 is preferably controlled to promote maximum precipitation at maximum rates. A suitable alkalinity is required to form solid $Mg(OH)_2$, enough carbonate to form solid calcium carbonate, and enough magnesium to remove the $SiO_2$ content. Caustic, for example, may be added to control alkalinity.

Preferably, also, scale conditioning agents are added to the incoming water to promote non-sticking qualities of the scale to the apparatus, or to promote a soft scale which may be washed out of the apparatus without difficulty.

FIG. 2, illustrates a second embodiment of the water softening apparatus of this invention demonstrating at least one significant modification and wherein elements identical to those in FIG. 1, are referred to by identical numbers.

Referring to FIG. 2, this embodiment produces desirable results without utilizing baffle cone deflecting member 5 or connected central conduit 7. In this embodiment all of the treated water as well as the sludge collected within the conical lower end of the vessel is flushed out of the chamber by internal chamber pressure to a liquid cyclone for separation of clarified water from precipitate.

This form of the invention, as shown in FIG. 2, is particularly suited but not limited to processing water with a low hardness content, such as about 100–500 p.p.m. range, wherein it is particularly suitable to discharge hot water through passage 21. Bleeder valve 55, integrally connected with bottom blow-out vent 2 and positioned above valve 29, serves to prevent excessive sludge build-up in the lower conical end of the chamber and sludge back flow into the processing chamber.

An alternative method of mounting the water softening apparatus is further illustrated in FIG. 2. The apparatus can be mounted on a frame and suspended therefrom by any suitable means connected to hooks 57.

The size of the vessel and temperatures and pressures maintained therein are dependent upon the hardness content of the water to be treated.

While the present invention has been edscribed in detail with respect to specific embodiments thereof, it is not intended that these embodiments circumscribe the invention except as it is limited by the claims. Although the specific elements of the apparatus of this invention have been described as having specific geometrical designs, such as cylindrical, this is done merely for the sake of clarity and is not intended to limit the scope of the invention.

I claim:

1. In a process for removing scale-forming salts from hard waters, the steps comprising:
    (a) contacting hard water intimately with steam to form a fluid mixture at a temperature and in an amount sufficient to bring the temperature of the hard water to labile precipitation temperature;
    (b) maintaining said fluid mixture in an agitated condition within the treating zone to achieve rapid precipitation of scale-forming salts;
    (c) discharging said fluid mixture into a second zone, said mixture having particles of precipitate suspended therein;
    (d) maintaining said fluid mixture as a large body in a relatively quiescent state, thereby permitting complete precipitation and effecting separation and settling of the precipitant solids which form a sludge;
    (e) discharging a supernatant water layer substantially free of precipitate;
    (f) separately discharging the separated sludge;
    (g) passing the sludge into a second settling zone to effect further separation of clarified water from the precipitate;
    (h) discharging the clarified water from the second settling zone;
    (i) separately discharging the residual sludge from the zone; and
    (j) recirculating a portion of the sludge from the second settling zone to the treating zone to induce and accelerate the labile precipitating condition.

2. The process of claim 1, wherein the supernatant water layer discharged in step (e) is passed to a third settling zone to effect further removal of entrained precipitate.

3. The process of claim 2 wherein the superheated steam enters the treating zone at about 360° F. under about 150 p.s.i.g. and the hard water enters the treating zone at about 70° F.

4. In a process for removing scale-forming salts from hard waters, the steps comprising:
    (a) contacting hard water intimately with steam to form a fluid mixture at a temperature and in an amount sufficient to bring the temperature of the hard water to labile precipitation temperature;
    (b) maintaining said fluid mixture in an agitated condition within the treating zone to achieve rapid precipitation of scale-forming salts;
    (c) discharging said fluid mixture into a second zone, said mixture having particles of precipitate suspended therein;
    (d) maintaining said fluid mixture as a large body in a relatively quiescent state, thereby permitting complete precipitation and effecting separation and setting of the precipitant solids which form a sludge;
    (e) discharging the water-sludge mixture;
    (f) passing said water-sludge mixture into a second settling zone to effect further separation of clarified water from the precipitate;
    (g) discharging the clarified water from the second settling zone;
    (h) separately discharging the residual sludge from the zone; and
    (i) recirculating a portion of the sludge from the second settling zone to the treating zone to induce and accelerate the labile precipitating condition.

5. The process of claim 4 wherein the superheated steam enters the treating zone at about 360° F. under about 150 p.s.i.g. and the hard water enters the treating zone at about 70° F.

6. Apparatus adapted for converting hard water into hot soft water comprising:
    (a) a housing having a blow-out vent, a treating zone and a settling zone therein;
    (b) a hard water inlet mounted in said housing, having a plurality of jet nozzles therein through which hard water discharges into said treating zone of the housing at high velocity and rapid flow;
    (c) a steam inlet mounted in and for the introduction of superheated steam into said housing having a plurality of jet nozzles therein in spaced relationship to said hard water jet nozzles through which steam discharges into said treating zone of the housing at high velocity and rapid flow;
    (d) a hull situated within said housing and in spaced relationship thereto and connected therewith at its upper and lower end, said hull and said housing defining therebetween a passage for the discharge of steam;
    (e) an inlet mounted in said housing for the discharge of steam through said steam passage;
    (f) an outlet mounted in said housing for the withdrawal of steam from said steam passage;

(g) insulating means for preventing the loss of heat through said hull;

(h) means for regulating the discharge of sludge and turbid water passing through said blow-out vent from the settling zone of said housing; and (i) means for recirculating a portion of the discharged sludge and introducing said sludge into the treating zone of said housing.

7. Apparatus adapted for the conversion of hard water to hot soft water as set forth in claim 6, wherein said hull and said housing define therebetween a passage for the discharge of hot water.

8. Apparatus adapted for the conversion of hard water to hot soft water as set forth in claims 6 or 7 wherein a bleeder valve is mounted on said regulating means.

9. Apparatus adapted for converting hard water into hot soft water comprising:

(a) a housing having a blow-out vent; a treating zone and a settling zone therein;

(b) a head demountably connected to seal said housing;

(c) a hard water inlet mounted in said head having a plurality of jet nozzles therein through which hard water discharges into said treating zone of the housing at high velocity and rapid flow;

(d) a steam inlet mounted in said head and for the introduction of super-heated steam into said housing and having a plurality of jet nozzles therein in spaced relationship to said hard water jet nozzles through which steam discharges into said treating zone of the housing at high velocity and rapid flow;

(e) a hull situated within said housing and in spaced relationship thereto and connected therewith at its upper and lower end, said hull and said housing defining therebetween a passage for the discharge of steam;

(f) an inlet mounted in said housing for the discharge of steam through said steam passage;

(g) an outlet mounted in said housing for the withdrawal of steam from said steam passage;

(h) insulating means for preventing the loss of heat through said hull;

(i) means for regulating the discharge of sludge and turbid water passing through said blow-out vent from the settling zone of said housing;

(j) a bleeder valve mounted on said regulating means; and (k) means for recirculating a portion of the discharged sludge and introducing said sludge into the treating zone of said housing.

10. Apparatus adapted for converting hard water into hot soft water comprising:

(a) a housing having a blow-out vent, a treating zone and a settling zone therein;

(b) a hard water inlet mounted in said housing having a plurality of jet nozzles therein through which hard water discharges into said treating zone of the housing at high velocity and rapid flow;

(c) a steam inlet mounted in and for the introduction of super-heated steam into said housing having a plurality of jet nozzles therein in spaced relationship to said hard water jet nozzles through which steam discharges into said treating zone of the housing at high velocity and rapid flow;

(d) an upstanding conical baffle mounted within said housing above the lower end thereof and in spaced relationship to said hard water and steam inlets;

(e) a pipe upstanding from said baffle and extending through said housing for connection to an outlet line for the discharge of process steam;

(f) a hull situated within said housing and in spaced relationship thereto and connected therewith at its upper and lower end, said hull and said housing defining therebetween a passage for the discharge of steam;

(g) an inlet mounted in said housing for the discharge of steam through said steam passage;

(h) an outlet mounted in said housing for the withdrawal of steam from said steam passage;

(i) insulating means for preventing the loss of heat through said hull;

(j) means for regulating the discharge of sludge and turbid water passing through said blow-out vent from the settling zone of said housing; and (k) means for recirculating a portion of the discharged sludge and introducing said sludge into the treating zone of said housing.

11. Apparatus adapted for the conversion of hard water to hot soft water as set forth in claim 10, wherein said hull and said housing define therebetween a passage for the discharge of hot water.

12. Apparatus adapted for the conversion of hard water to hot soft water as set forth in claim 6 or 7 wherein a bleeder valve is mounted on said regulating means.

13. Apparatus adapted for converting hard water into hot soft water comprising:

(a) a housing having a blow-out vent, a treating zone and a settling zone therein;

(b) a head demountably connected to seal said housing;

(c) a hard water inlet mounted in said head having a plurality of jet nozzles therein through which hard water discharges into said treating zone of the housing at high velocity and rapid flow;

(d) a steam inlet mounted in said head and for the introduction of super-heated steam into said treating zone of the housing and having a plurality of jet nozzles therein in spaced relationship to said hard water jet nozzles through which steam discharges into the treating zone of the housing at high velocity and rapid flow;

(e) an upstanding conical baffle mounted within said vessel in spaced relationship to said hard water and steam inlets;

(f) a central pipe upstanding from said baffle and extending through said housing for connection to an outlet line for the discharge of hot soft water;

(g) a hull situated within said housing and in spaced relationship thereto and connected therewith at its upper and lower end, said hull and said housing defining therebetween a passage for the discharge of steam;

(h) an inlet mounted in said housing for the discharge of steam through said steam passage;

(i) an outlet mounted in said hull for the withdrawal of steam from said steam passage;

(j) insulating means for preventing the loss of heat through said hull;

(k) means for regulating the discharge of sludge and turbid water passing through said blow-out vent from the settling zone of said housing;

(l) a bleeder valve mounted on said regulating means; and (m) means for recirculating a portion of the discharged sludge and introducing said sludge into the treating zone of said housing.

References Cited

UNITED STATES PATENTS

| 434,592 | 8/1890 | Ferreira | 210—56 |
| 1,060,901 | 5/1913 | Hodges | 210—56X |
| 2,401,924 | 6/1946 | Goetz | 210—46 |
| 2,775,555 | 12/1956 | Clarkson | 210—56X |
| 3,026,261 | 3/1962 | Mayfield et al. | 210—56 |

MICHAEL ROGERS, Primary Examiner

U.S. Cl. X.R.

210—56, 73, 177, 182, 197, 512